US012614885B2

(12) United States Patent
Cheng et al.

(10) Patent No.: US 12,614,885 B2
(45) Date of Patent: Apr. 28, 2026

(54) POWER INLET ADAPTER AND SIGNAL TRANSMISSION LINE SYSTEM THEREOF

(71) Applicant: ELKA INTERNATIONAL LTD., New Taipei City (TW)

(72) Inventors: Yi-Chieh Cheng, New Taipei City (TW); Yu-Shuo Pan, New Taipei City (TW)

(73) Assignee: ELKA INTERNATIONAL LTD., New Taipei City (TW)

( * ) Notice: Subject to any disclaimer, the term of this patent is extended or adjusted under 35 U.S.C. 154(b) by 358 days.

(21) Appl. No.: 18/536,690

(22) Filed: Dec. 12, 2023

(65) Prior Publication Data

US 2024/0213729 A1 Jun. 27, 2024

(30) Foreign Application Priority Data

Dec. 22, 2022 (TW) ................................ 111214227

(51) Int. Cl.
*H01R 31/06* (2006.01)
*H01R 13/66* (2006.01)

(52) U.S. Cl.
CPC ....... *H01R 31/065* (2013.01); *H01R 13/6675* (2013.01); *H01R 2201/06* (2013.01)

(58) Field of Classification Search
None
See application file for complete search history.

(56) References Cited

U.S. PATENT DOCUMENTS 9,791,906 B2 * 10/2017 Hijazi .................... H01R 31/00
2009/0104799 A1 * 4/2009 Liu ...................... H01R 31/065 439/92
2019/0204882 A1 * 7/2019 Tseng ...................... G06F 1/266

FOREIGN PATENT DOCUMENTS

WO WO-2006076274 A1 * 7/2006 ......... H01R 13/7175
WO WO-2022174272 A1 * 8/2022 ............... H04B 3/54

* cited by examiner

*Primary Examiner* — Tho D Ta
(74) *Attorney, Agent, or Firm* — Birch, Stewart, Kolasch & Birch, LLP

(57) ABSTRACT

A power inlet adapter for connecting a signal transmission line and a first device is disclosed. The power inlet adapter includes a main body and a power inlet end. The main body includes a socket end, a plug end, and a circuit board. The power inlet end is configured to electrically couple with a first socket to receive a second power signal, wherein the power inlet end is connected to the main body through a connecting cable and electrically coupled to the circuit board via conducting wires in the connecting cable. The circuit board has a control module configured to receive the first power signal and the second power signal. The control module is configured to provide an output power signal to the socket end by regulating the first power signal and the second power signal.

13 Claims, 7 Drawing Sheets

POWER INLET ADAPTER AND SIGNAL TRANSMISSION LINE SYSTEM THEREOF

FIELD OF THE INVENTION

The present invention relates to a power inlet adapter and a signal transmission line thereof, in particular to a power inlet adapter for an active transmission line and a signal transmission line thereof.

BACKGROUND OF THE INVENTION

When operating an active signal transmission line, it is necessary to provide enough power to activate the redriver of the active signal transmission line. However, if the device connected to the signal transmission line cannot provide enough power or is shut down, the supply of power to the signal transmission line from the interface of the device connected to the signal transmission line will be stopped or insufficient. The power supplied from the interface may not meet the power supply specification of the signal transmission line, such as insufficient voltage, power, or current. When the interface of the device cannot supply the required power to the active signal transmission line, the active signal transmission line will fail. For example, the active signal transmission line may not transmit signals, so the active signal transmission line may need to be reset, or the active signal transmission line will not be able to be used, which will greatly affect the user experience.

In addition, different devices may have different configurations for the output interfaces. For example, the electronic device has a size limitation to the circuit board for arranging the input/output interfaces, such as a motherboard. Therefore, the distance between input/output ports on the circuit board may be limited and not have enough space to accommodate a larger connector. As an example, components arranged on the circuit board, such as parts around the input/output ports, wires, shells, etc., will also limit the space for installing the connector. Furthermore, the connector size of the active signal transmission line must follow the standard specification. Therefore, the accommodating space of the connector may not have additional space to arrange lines/circuits for additional power supply. If additional power supply lines/circuits are forcefully added, it can result in mechanical interference within the connector installation space, leading to potential failure in the installation or usage of the active signal transmission line.

On the other hand, many factors need to be considered to determine whether the active signal transmission line requires an external power supply. In simpler terms, an external power supply for the active signal transmission line is not required in every situation. For example, when the device can supply stable and sufficient power, the signal transmission line can directly obtain the required power from the device through the interface. In such a case, the active signal transmission line does not need an external power supply. If additional power supply lines/circuits are forcibly added to the connector of the active signal transmission line, it will lead to an increase in production costs or the wastage of manufacturing resources.

Therefore, determining how to offer users/installers a flexible and effective solution will be a significant research focus in the technical field.

SUMMARY OF THE INVENTION

One object of the present invention is to provide a power supply that enables the active signal transmission line to have sufficient power.

Another object of the present invention is to provide a flexible power supply means that allows users to select the manner of supplying power to the active signal transmission line according to device settings or space requirements.

The present invention provides a power inlet adapter for connecting a signal transmission line and a first device. The power inlet adapter includes a main body and a power inlet end. The main body includes a socket end, a plug end, and a circuit board. The socket end is configured to electrically couple with the first plug of the signal transmission line. The plug end is configured to electrically couple with the first device and receive a first power signal provided by the first device. The circuit board is configured to electrically connect the socket end and the plug end. The power inlet end is configured to electrically couple with a first socket to receive a second power signal, wherein the power inlet end is connected to the main body through a connecting cable and electrically coupled to the circuit board via conducting wires in the connecting cable. The circuit board has a control module configured to receive the first power signal and the second power signal. The control module is configured to provide an output power signal to the socket end by regulating the first power signal and the second power signal.

The present invention provides a signal transmission line system. The signal transmission line system includes a signal transmission line and a power inlet adapter. The signal transmission line includes a first plug, a second plug, and a line set connected between the first plug and the second plug. The power inlet adapter includes a main body and a power inlet end. The main body includes a socket end, a plug end, and a circuit board. The socket end is configured to electrically couple with the first plug of the signal transmission line. The plug end is configured to electrically couple with the first device and receive a first power signal provided by the first device. The circuit board is configured to electrically connect the socket end and the plug end. The power inlet end is configured to electrically couple with a first socket to receive a second power signal, wherein the power inlet end is connected to the main body through a connecting cable and electrically coupled to the circuit board via conducting wires in the connecting cable. The circuit board has a control module configured to receive the first power signal and the second power signal. The control module is configured to provide an output power signal to the socket end by regulating the first power signal and the second power signal. The first plug is detachably connected to the socket end of the power inlet adapter. The first plug receives the output power signal from the socket end and provides the output power signal to the second plug via the line set.

In an embodiment, the specification of the power inlet end is selected from one of the USB and DC current connector.

In an embodiment, the specification of the plug end corresponds to HDMI (High Definition Multimedia Interface).

In an embodiment, the control module is a power selecting circuit, and the power selecting circuit selects one of the first power signals and the second power signal with a higher voltage as the output power signal.

In an embodiment, the power-selecting circuit includes a first diode and a second diode, the anode of the first diode is configured to receive the first power signal, the anode of the second diode is configured to receive the second power signal, and the cathode of the first diode is coupled to the cathode of the second diode.

In an embodiment, the signal transmission line has a redriver, and the control module provides the output power signal to the redriver via the socket end.

In an embodiment, the redriver is arranged inside the second plug.

In an embodiment, the first plug receives a data signal from the first device, and the data signal is transmitted to a second device electrically connected to the second plug via the line set.

With the power inlet adapter mentioned above, the signal transmission line can selectively obtain power from different interfaces. The power inlet adapter can regulate the power signal output to the signal transmission line using the control module of the power inlet adapter. Moreover, with the detachable installation feature, when the signal transmission line does not require an additional power supply, the power inlet adapter can be removed from the signal transmission line. Furthermore, when the interface installation space is limited, users may select different types of adapters (such as different sizes) to avoid mechanism interference.

BRIEF DESCRIPTION OF THE DRAWINGS

The accompanying drawings are presented to aid in the description of various aspects of the present invention and are provided solely for illustration of the aspects. To simplify the drawings and highlight the contents to be presented in the drawings, the well-known structures or elements in the drawings may be drawn in a simple schematic manner or presented in an omitted manner. For example, the number of elements may be singular or plural. These drawings are provided only to explain these aspects and not to limit thereof.

DETAILED DESCRIPTION OF THE PREFERRED EMBODIMENTS

Even though the terms such as "first", "second", and "third" may be used to describe an element, a part, a region, a layer, and/or a portion in the present specification, these elements, parts, regions, layers and/or portions are not limited by such terms. Such terms are used to differentiate an element, a part, a region, a layer, and/or a portion from another element, part, region, layer, and/or portion. Therefore, in the following discussions, a first element, portion, region, or portion may be called a second element, portion, region, layer, or portion, and do not depart from the teaching of the present disclosure. The terms "comprise," "include", or "have" used in the present specification are open-ended terms and mean to "include", but not limited to.

As used herein, the term "coupled to" in the various tenses of the verb "coupled" may mean that element A is directly connected to element B or that other elements may be connected between elements A and B (i.e., that element A is indirectly connected with element B).

The terms "approximate" or "essentially" used in the present specification include the value itself and the average values within the acceptable range of deviation of the specific values confirmed by a person having ordinary skill in the current art, considering the specific measurement discussed and the number of errors related to such measurement (that is, the limitation of the measurement system). For example, "about" may mean within one or more standard deviations of the value itself or ±30%, +20%, +10%, +5%. In addition, "about", "approximate", or "essentially" used in the present specification may select a more acceptable range of deviation or standard deviation based on optical property, etching property, or other properties. One cannot apply one standard deviation to all properties.

In the present invention, for convenience of explanation, plugs and sockets are used for explanation. A plug may refer to a male contact, such as a male connector or a pin. On the other hand, a socket may refer to a female contact for receiving the male contact, such as a female connector or a pin seat. Those of ordinary skill in the art will know that the male contact and the female contact in the present invention can be equivalently exchanged and/or replaced without affecting the implementation of the invention.

First Embodiment

Figure 1:
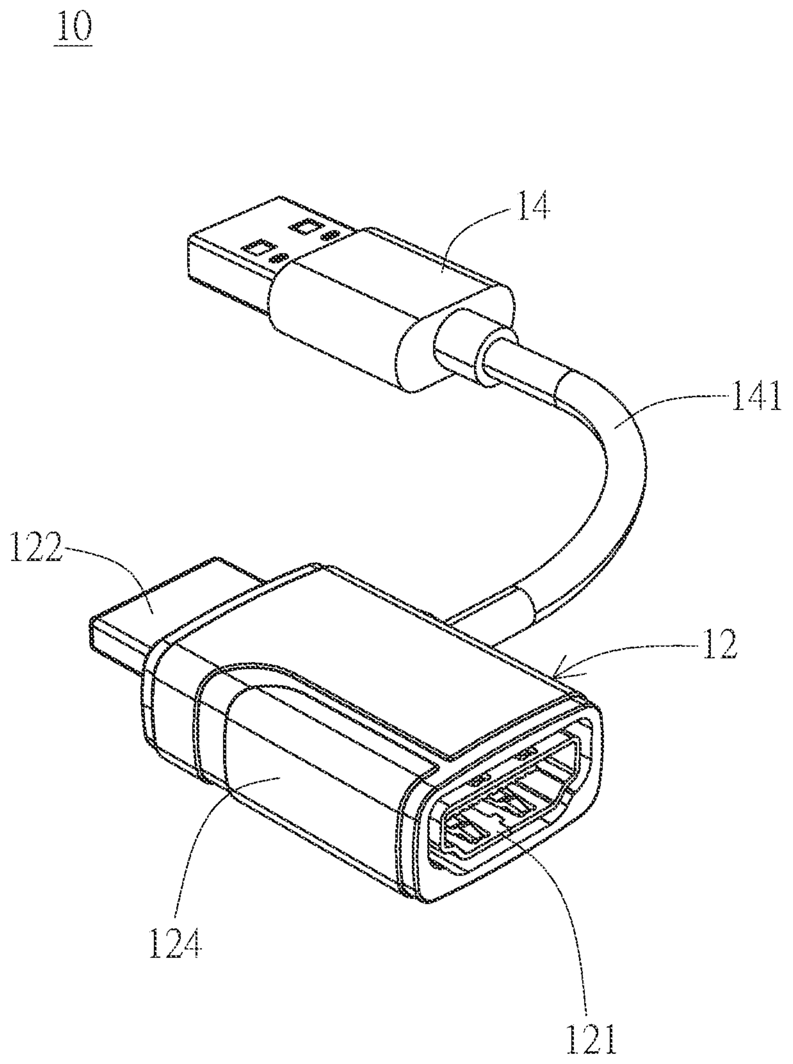
FIG. 1 and FIG. 2 are side views of the power inlet adapter according to the first embodiment of the present invention.
Figure 2:
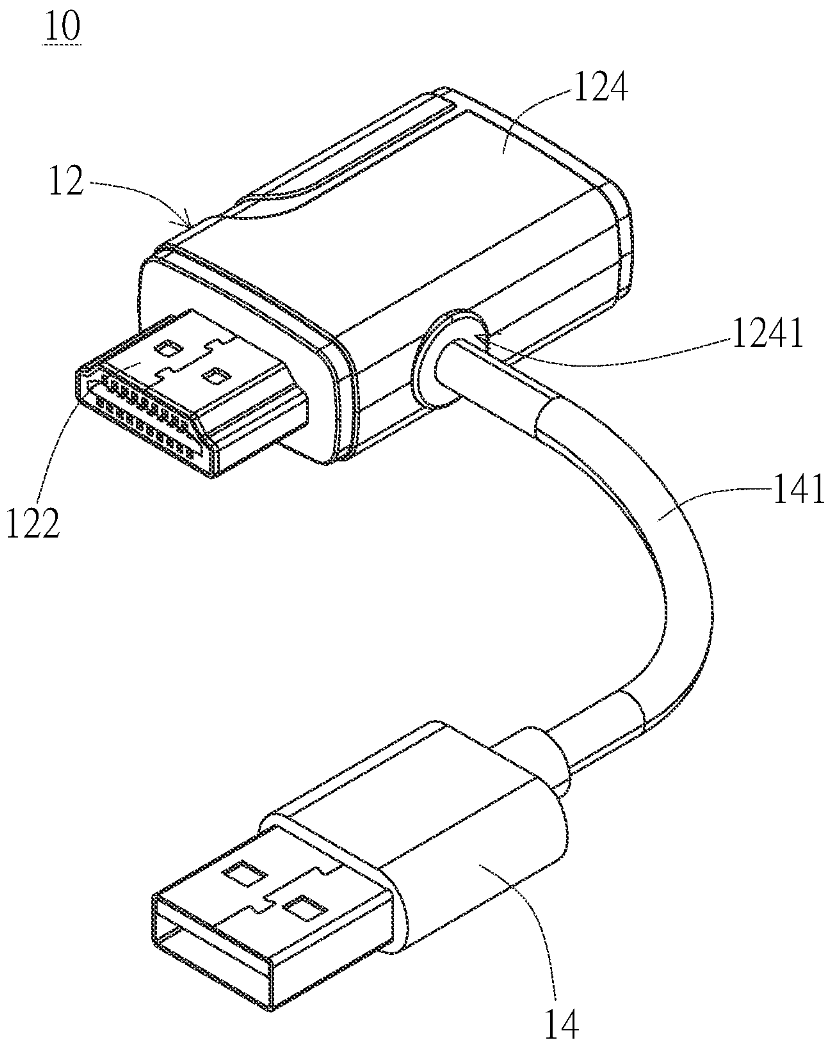
Figure 3:
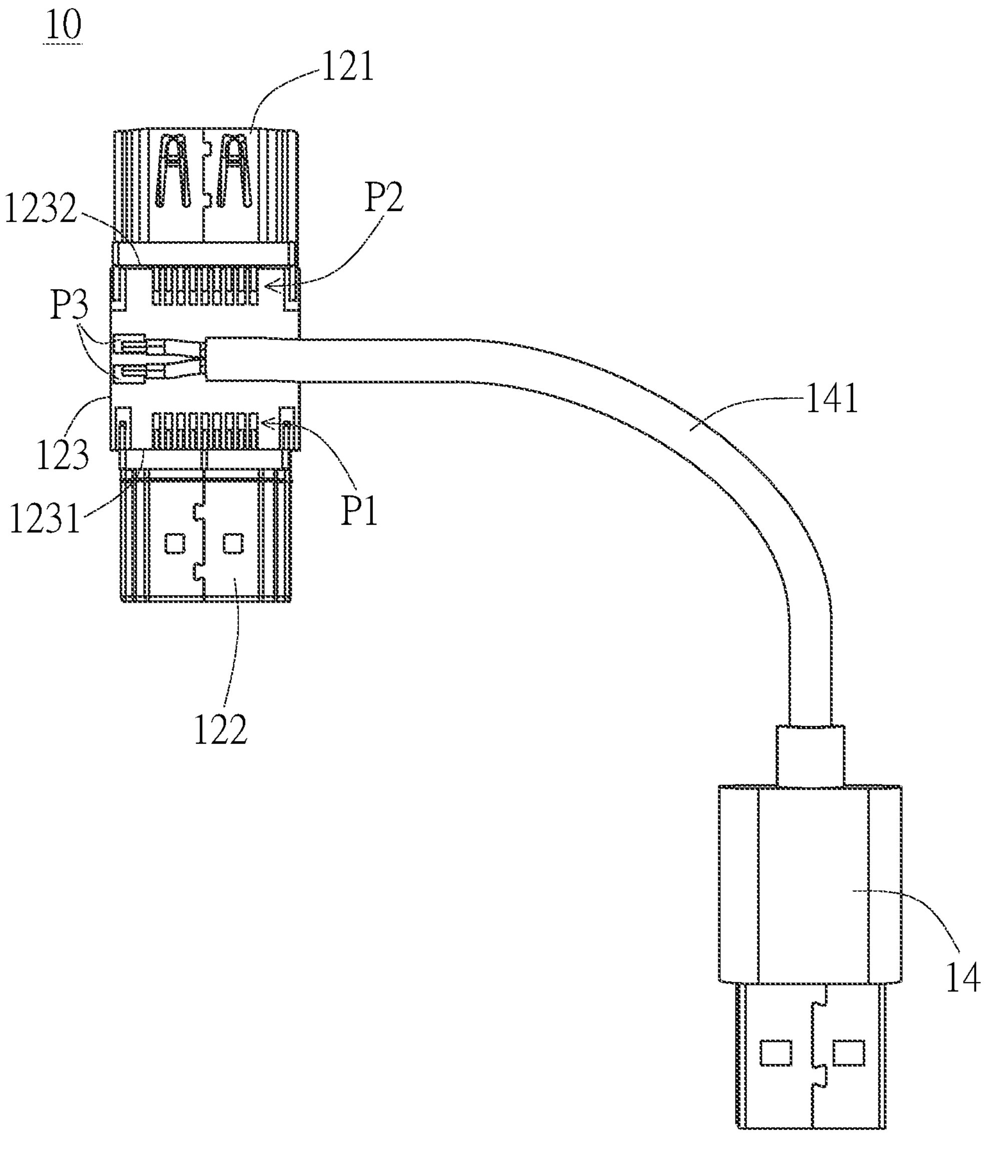
FIG. 3 is a top view of the power inlet adapter without the shell according to the first embodiment of the present invention.

Refer to FIG. 1, FIG. 2, and FIG. 3, which illustrate the power inlet adapter 10. The power inlet adapter 10 includes a main body 12 and a power inlet end 14. The main body 12 includes a socket end 121, a plug end 122, and a circuit board 123. The circuit board 123 is configured to connect the socket end 121 and the plug end 122. The plug end 122 is configured to receive a first power signal PW1. The power inlet end 14 is configured to receive a second power signal PW2. The power inlet end 14 is connected to the main body 12 through the connecting cable 141 and electrically coupled to the circuit board 123 via the conducting wire(s) in the connecting cable 141. The circuit board 123 has a control module 1234 (shown in FIG. 4), which is configured to receive the first power signal PW1 and the second power signal PW2. The control module 1234 is configured to provide an output power signal PW0 to the socket end 121 by regulating the first power signal PW1 and the second power signal PW2.

More specifically, the main body 12 may further include a shell 124, which can be formed by, for example, plastics or conducting materials. The shell 124 covers the socket end 121 and the plug end 122 and forms a space for accommodating the circuit board 123. One side of shell 124 (such as the side 1241 shown in FIG. 2, but not limited thereto) has a through hole (the position of the through hole is shown but not marked in FIG. 2) for arranging the connecting cable 141 connected to the power inlet end 14, so the power inlet end 14 can be electrically coupled to the circuit board 123 located inside the main body 12 through the connecting cable 141, which is inserted into the main body 12 from the through hole.

It should be noted that, although the specification of the socket end 121 is shown in FIGS. 1-3 corresponds to the female socket of HDMI, and the specification of the plug end 122 is shown in FIGS. 1-3 corresponds to the male plug of HDMI, the socket end 121 and the plug end 122 in the present invention are not limited to HDMI. For example, the socket end 121 and the plug end 122 may be selected from the specifications of DisplayPort (DP) or other universal connector interfaces. In addition, the socket end 121 and the plug end 122 may have the same or different interfaces/types. For example, when the socket end 121 is HDMI, the plug end 122 may be HDMI or another different interface (such as DP interface). The above is only an example, and the corresponding relationship between the socket end 121 and the plug end 122 is not limited to the above example.

It should be noted that, although the power inlet end 14 is shown in FIGS. 1-3 is the USB interface, and the power inlet end 14 can be any suitable interface for power supply. For example, the power inlet end 14 can be a USB or DC jack or other suitable connectors.

The first power signal PW1 is provided by the first socket (such as HDMI) of a device (such as a computer or a set-top box). The plug end 122 is electrically connected to the first socket of the device and receives the first power signal PW1. In general, the first power signal PW1 is a DC signal (e.g. DC 5V). On the other hand, the second power signal PW2 may be provided by a second socket of the device. The power inlet end 14 is electrically connected to, for example, the second socket of the device and receives the second power signal PW2. In other words, the plug end 122 and the power inlet end 14 are electrically connected to different interfaces of the same device. However, in another embodiment, the power inlet end 14 can be connected to another device or a socket of an AC/DC converter (such as AC 110V to DC 5V). In other words, the present invention is not limited to the arrangement of the power inlet end 14 or the source of the second power signal PW2.

Referring to FIG. 3, circuit board 123 is, for example, a printed circuit board, which is arranged inside the main body 12. The first group of contact pads P1 will be arranged at the side 1231 of the circuit board 123, and the first group of contact pads P1 is configured to electrically couple with the pins of the socket end 121. A second group of contact pads P2 will be arranged at side 1232 of the circuit board 123, and the second group of contact pads P2 configured to electrically couple with the pins of the plug end 122. A third group of contact pads P3 will be arranged on the circuit board 123, and the third group of contact pads P3 is configured to electrically couple with the power inlet end 14. It should be noted that the upper and lower surfaces of circuit board 123 can be laid out with the groups of contact pads (P1, P2, P3). The present invention is not limited to the arranging positions of the groups of contact pads (P1, P2, P3) and the number of pads in each of the groups of contact pads (P1, P2, P3).

Figure 4:
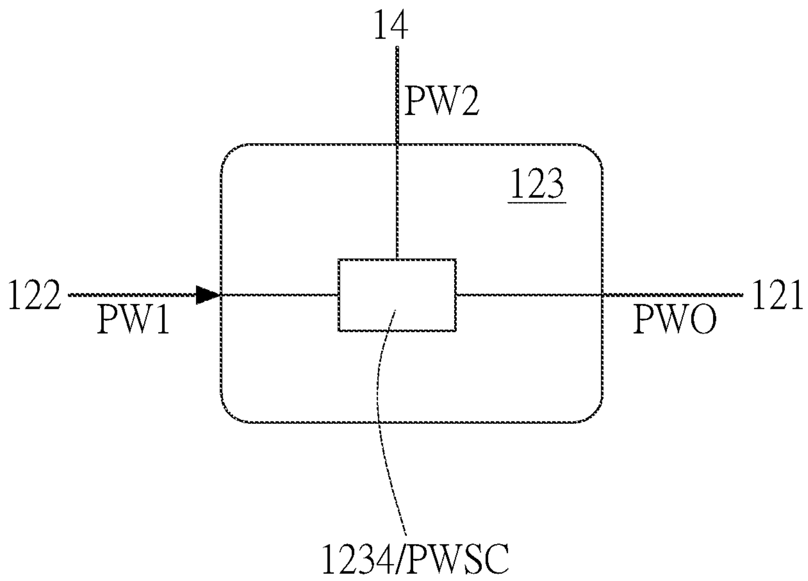
FIG. 4 is a block diagram of the circuit board according to the first embodiment of the present invention.

Referring to FIG. 4, the control module 1234 is, for example, a circuit architecture with two inputs and one output. The control module 1234 can be composed of components with computing/processing capabilities, such as integrated circuits (IC), application-specific integrated circuits (ASIC), microprocessors, or Field Programmable Gate Arrays (FPGA). On the other hand, the control module 1234 can also be composed of active and passive components, such as comparators, multiplexers, switches, transistors, diodes, resistors, capacitors, inductors, etc. The present invention is not limited to the configuration or architecture of the control module 1234. In the embodiment, the control module 1234 outputs the power signal PW0 by regulating the first power signal PW1 and the second power signal PW2. More specifically, the control module 1234 can regulate the first power signal PW1 and the second power signal PW2 by switching, adjusting, integrating/aggregating, or other manners, to provide the output power signal PW0. In an example, the control module 1234 may adjust the output ratio of the first power signal PW1 to the second power signal PW2, to output the required power of the transmission line, which is connected to socket end 121.

More specifically, the output ratio of the first power signal PW1 to the second power signal PW2 can be, for example, an on/off switching (0:1 or 1:0). Referring to FIG. 4, the control module 1234 may be a power selecting circuit PWSC, and the power selecting circuit PWSC is configured to select one of the first power signal PW1 and the second power signal PW2 to be the output power signal PW0. In an example, the power selecting circuit PWSC can be switched based on the voltage level of the first power signal PW1 and the second power signal PW2. Taking actual values as an example, when the voltage level of the first power signal PW1 is 4.7 V, and the voltage level of the second power signal PW2 is 5 V, the power selecting circuit PWSC may select and provide the second power signal PW2 to the socket end 121. Accordingly, the signal transmission line connected to socket end 121 will receive the second power signal PW2 (DC 5V).

Figure 5:
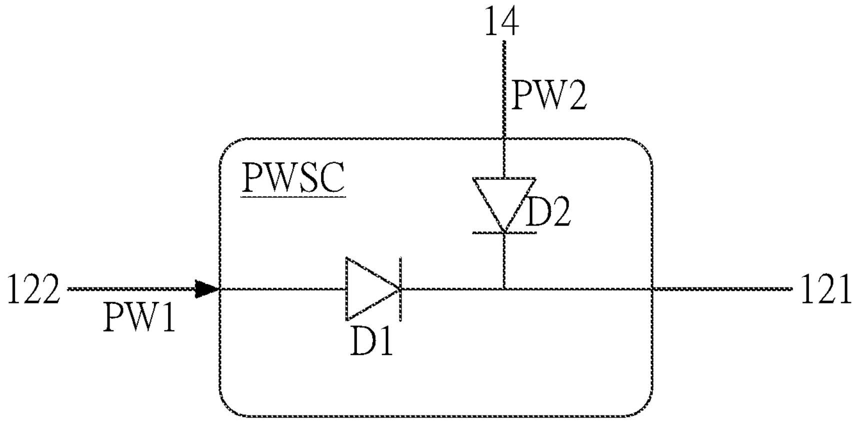
FIG. 5 is a simplified circuit diagram of the power-selecting circuit according to the first embodiment of the present invention.

In the embodiment, one of the exemplary implementations of the power-selecting circuit PWSC may refer to FIG. 5. FIG. 5 illustrates that the power-selecting circuit PWSC includes a first diode D1 and a second diode D2. The anode of the first diode D1 receives the first power signal PW1, the anode of the second diode D2 receives the second power signal PW2, and the cathodes of the first diode D1 and the second diode D2 are coupled to each other. In the exemplarily implementation, one of the first diode D1 and the second diode D2 which corresponds to one of the first power signal PW1 and the second power signal PW2 which has a higher potential (voltage) will be given forward bias and turned on, while the other will be given reverse bias and turned off.

Taking actual values as an example, in the case that the voltage level of the first power signal PW1 is 5V, and the voltage level of the second power signal PW2 is 4.7V, the first diode D1 which corresponds to the first power signal PW1 (e.g. 5V) will be turned on, and the second diode D2 which corresponds to the second power signal PW2 (e.g. 4.7V) will be turned off. Therefore, the first power signal PW1 can be output from the output terminal connected to the cathode of the first diode D1 to the socket end 121. The second diode D2 which is turned off can avoid the bias voltage from the first power signal PW1 to the device that provides the second power signal PW2, so the device that provides the second power signal PW2 can be protected. On the contrary, in the case that the voltage level of the second power signal PW2 is greater than that of the first power signal PW1, the second diode D2 will be turned on, and the first diode D1 will be turned off. The second power signal PW2 may be output from the output terminal connected to the cathode of the second diode D2 to the socket end 121. The first diode D1 which is turned off can avoid bias voltage from the second power signal PW2 to the device that provides the first power signal PW1, so the device that provides the first power signal PW1 can be protected. It should be noted that the threshold voltages of the diodes D1 and D2 have been ignored in this exemplary embodiment to simplify the explanation. In other words, the exemplary embodiment assumed assumes that the threshold voltages of diodes D1 and D2 are 0V. However, people skilled in the art will understand that there may be slight differences in the voltage level between the two ends of the first diode D1, or the second diode D2 after the diode has been turned on due to the threshold voltage. Therefore, the present invention is not limited to the specifications or electrical characteristics of the first diode D1 or the second diode D2.

Figure 6:
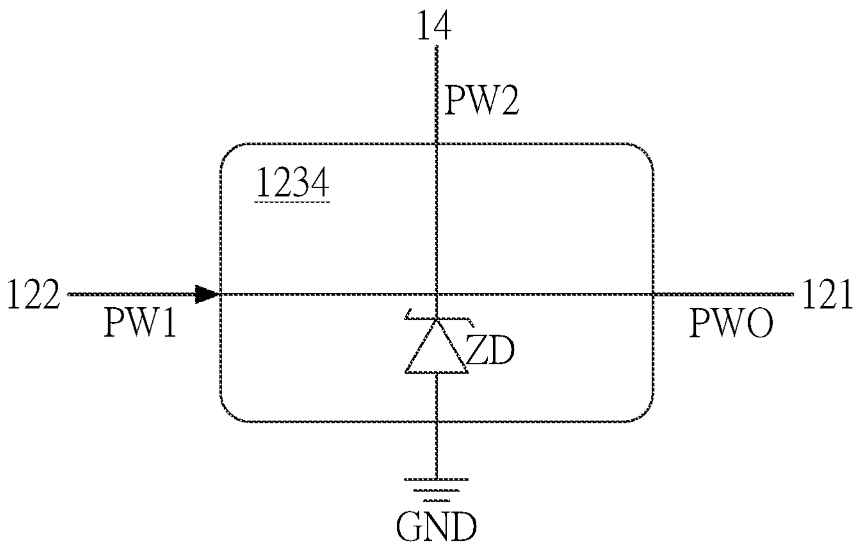
FIG. 6 is a simplified circuit diagram for an exemplary implementation of the control module according to the first embodiment of the present invention.

The output ratio of the first power signal PW1 to the second power signal PW2 can be any suitable ratio. For example, referring to FIG. 6, in another embodiment, the control module 1234 may include at least one Zener diode ZD. The cathode of the Zener diode ZD receives the first power signal PW1 and the second power signal PW2. The anode of the Zener diode ZD is coupled to the output terminal that provides the output power signal PW0. The anode of the Zener diode ZD is coupled to the electrical neutral point or grounding point (i.e., voltage: 0V). The Zener diode ZD can stabilize the output power signal PW0 at the Zener voltage (the reverse breakdown voltage) of the Zener diode ZD (e.g. 5V). In this circuit architecture, the voltage stabilizing effect provided by the Zener diode ZD can prevent the voltage provided by the first power signal PW1 and/or the second power signal PW2 exceeding the required power of the transmission line, which is connected to the socket end 121. However, the means of voltage stabilization in the control module 1234 is not limited to the embodiment.

Second Embodiment

Figure 7:
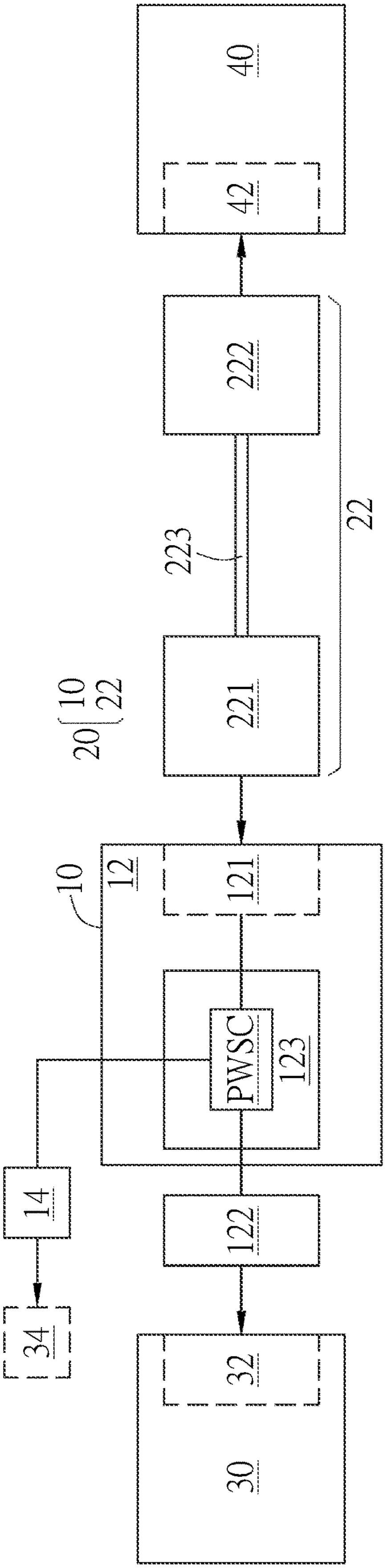
FIG. 7 is a block diagram of the signal transmission line system according to a second embodiment of the present invention.

FIG. 7 illustrates the signal transmission line system 20 including the power inlet adapter 10 mentioned above. Referring to FIG. 7, the signal transmission line system 20 includes the signal transmission line 22 and the power inlet adapter 10. The signal transmission line 22 includes a first plug 221, a second plug 222, and a line set 223 connected between the first plug 221 and the second plug 222. The first plug 221 is detachably connected to the socket end 121 of the power inlet adapter 10. The first plug 221 receives a higher voltage than one of the first power signals PW1 and the second power signal PW2 from the socket end 121, and then provides the higher voltage to the second plug 222 via the line set 223.

More specifically, the signal transmission line 22 is preferably an active signal transmission line. For example, the first plug 221 and/or the second plug 222 of the signal transmission line 22 can be set with a redriver (not shown in FIG. 7), and the redriver can be set at the first plug 221 and/or the second plug 222. The redriver is preferably a driving chip, and the driving chip is preferably set at the second plug 222. The redriver and/or the driving chip can serve as a signal processing means for processing signals transmitted on the signal transmission line 22, for example, but not limited to, amplification, conversion, or other signal processing functions.

The interface of the first plug 221 of the signal transmission line 22 corresponds to the socket end 121 of the power inlet adapter 10. For example, in the case that the first plug 221 is an HDMI male header, the socket end 121 may be an HDMI female header. However, the present invention is not limited to the interfaces/types of the signal transmission line 22. Generally, people skilled in the art will know that the signal transmission line 22 can also be a transmission line with a DP interface or other regular/general signal transmission lines. On the other hand, in the embodiment, the first plug 221, and the second plug 222 may have the same or different interfaces. For example, the first plug 221 and the second plug 222 can both be but are not limited to HDMI. When the first plug 221 and the second plug 222 are two different interfaces, a conversion between the two different interfaces can be carried out by the redriver arranged at the first plug 221 and/or the second plug 222. It is noted that the interface conversion is not limited to the redriver; the interface conversion can also be carried out by other means as appropriate.

In an embodiment, the first device 30 refers to various source devices, such as a computer or a set-top box. The specification of the first socket 32 of the first device 30 corresponds to the plug end 122. For example, in the case that the plug end 122 is an HDMI male header, the first socket 32 is an HDMI female header. The specifications of the plug end 122 and the first socket 32 are not limited to HDMI. People skilled in the art will know that the first socket 32 can also be a socket for DP or other interfaces.

The first device 30 may be in a first state, such as the startup (wake-up) state of the first device 30. At the first state, the first device 30 can provide the first power signal PW1 to the plug end 122 via the first socket 32. However, when the first device 30 is in a second state, such as sleep, standby, or low power consumption state, the first socket 32 of the first device 30 will not provide the first power signal PW1 or will provide the first power signal PW1 which is unable to activate the redriver of the signal transmission line 22.

The power inlet end 14 can be a USB (type-A, type-C), a DC power connector (DC jack), or other suitable connectors. The specification of the second socket 34 corresponds to the power inlet end 14. For example, in the case that the power inlet end 14 is a USB type-A male header, the second socket 34 is a USB type-A female header. The second socket 34 may be electrically connected to the first device 30 and receive the second power signal PW2 from the first device 30 when the first device 30 is in the first state or the second state. However, in another embodiment, the second socket 34 can be electrically connected to another device or an AC/DC converter (such as an AC 110V to DC 5V converter). In the case that the second socket 34 is connected to the AC/DC converter, regardless of whether device 30 is in the first state or the second state, the second socket 34 can still receive the second power signal PW2 and provide it to the control module (e.g. PWSC) of the power inlet adapter 10. Accordingly, the present invention is not limited to the electrical connection arrangement of the second socket 34.

The second socket 34 corresponds to the interface of the power inlet end 14. For example, in the case that the power inlet end 14 is a USB type-A male header, the second socket 34 may be a USB type-A female header. In the embodiment shown in FIG. 3, the second socket 34 can be arranged on and electrically connected to device 30 to continuously provide the second power signal PW2 when device 30 is in the first state or the second state. However, in another embodiment, the second socket 34 can be arranged on and electrically connected to another device (not shown in the figure) or to an AC/DC converter (such as an AC 110V to DC 5V converter). In such a case, regardless of whether the first device 30 is in the first state or the second state, the second socket 34 can still provide the second power signal PW2. Accordingly, the present invention is not limited to the electrical connection arrangement of the second socket 34.

The second plug 222 of the signal transmission line 22 is electrically connected to the third socket 42 of the second device 40. In an embodiment, the second device 40 may be various sink devices, such as a display device. The third socket 42 of the second device 40 is an interface corresponding to the second plug 222 of the signal transmission line 22. For example, in the case that the second plug 222 is, but not limited to, an HDMI male header, the third socket 42 can be an HDMI female header. People skilled in the art will understand that the third socket 42 can be a socket for DP or other interfaces.

In the embodiment, the signal transmission line system 20 receives the first power signal PW1 and the second power signal PW2 via the power inlet adapter 10, and the first power signal PW1 and the second power signal PW2 are regulated by the control module 1234 or power selecting circuit PWSC in the power inlet adapter 10. The output power signal PW0 provided by the power inlet adapter 10 will be transmitted to the second plug 222 and/or the second device 40. More specifically, the output power signal PW0 transmitted to the second plug 222 may, but is not limited to, activate the redriver arranged in the second plug 222. On the other hand, the output power signal PW0 transmitted to the second device 40 may be configured to, but not limited to, wake up the second device 40 or enable the second device 40 to stay in the activation state.

Although the examples of the present invention focus on the provision of electricity, in other embodiments, the data signal provided by the first device 30 can be transmitted to the second device 40 by the signal transmission line system 20 via the power inlet adapter 10 and the signal transmission line 22. However, the functionality of the signal transmission line system 20 of the present invention is not limited thereto.

In summary, with the detachable power inlet adapter 10, the signal transmission line 22 can obtain power from the second socket 34 of a source device (e.g. the first device 30) and provide it to the second device 40 connected to the second plug 222 of the signal transmission line 22. Moreover, because the power inlet adapter 10 is detachable, when the signal transmission line 22 does not require an additional power supply, the power inlet adapter 10 can be optionally removed from the signal transmission line 22. In other situations, when the interface installation space of the first device 30 is limited, different types of power inlet adapters 10 (such as different main body shells and/or different wire lengths) can be selectively integrated or installed with the signal transmission line 22 to avoid mechanical interference.

The foregoing present invention is merely a preferred embodiment of the present invention and is not intended to limit the claims of the present invention. Any equivalent technical variation of the description and drawings of the present invention of the present shall be within the scope of the claims of the present invention.

What is claimed is:

1. A power inlet adapter for connecting a signal transmission line and a first device, the power inlet adapter comprising:

a main body including:

a socket end configured to electrically couple with a first plug of the signal transmission line;

a plug end configured to electrically couple with a first socket of the first device and receive a first power signal provided by the first device; and a circuit board configured to electrically connect the socket end and the plug end; and a power inlet end configured to electrically couple with a second socket of the first device or another device to receive a second power signal, wherein the power inlet end is connected to the main body through a connecting cable and electrically coupled to the circuit board via conducting wires in the connecting cable, wherein the circuit board has a control module configured to receive the first power signal and the second power signal, wherein the control module is configured to provide an output power signal to the socket end by regulating the first power signal and the second power signal.

2. The power inlet adapter of claim 1, wherein a specification of the power inlet end is selected from one of USB and DC current connector.

3. The power inlet adapter of claim 1, wherein a specification of the plug end corresponds to HDMI.

4. The power inlet adapter of claim 1, wherein the control module is a power selecting circuit; the power selecting circuit selects one of the first power signal and the second power signal with a higher voltage as the output power signal.

5. The power inlet adapter of claim 4, wherein the power selecting circuit includes a first diode and a second diode, an anode of the first diode is configured to receive the first power signal, an anode of the second diode is configured to receive the second power signal, and a cathode of the first diode is coupled to a cathode of the second diode.

6. A signal transmission line system, comprising:

a signal transmission line including a first plug, a second plug, and a line set connected between the first plug and the second plug; and a power inlet adapter comprising:

a main body including:

a socket end configured to electrically couple with the first plug of the signal transmission line;

a plug end configured to electrically couple with a first device and receive a first power signal provided by the first device; and a circuit board configured to electrically connect the socket end and the plug end; and a power inlet end configured to electrically couple with a first socket to receive a second power signal, wherein the power inlet end is connected to the main body through a connecting cable and electrically coupled to the circuit board via conducting wires in the connecting cable, wherein the circuit board has a control module configured to receive the first power signal and the second power signal, wherein the control module is configured to provide an output power signal to the socket end by regulating the first power signal and the second power signal, wherein the first plug is detachably connected to the socket end of the power inlet adapter, wherein the first plug receives the output power signal from the socket end and provides the output power signal to the second plug via the line set.

7. The signal transmission line system of claim 6, wherein a specification of the power inlet end is selected from one of USB and DC current connector.

8. The signal transmission line system of claim 6, wherein a specification of the plug end corresponds to HDMI.

9. The signal transmission line system of claim 6, wherein the control module is a power selecting circuit; the power selecting circuit selects one of the first power signal and the second power signal with a higher voltage as the output power signal.

10. The signal transmission line system of claim 9, wherein the power selecting circuit includes a first diode and a second diode, an anode of the first diode is configured to receive the first power signal, an anode of the second diode is configured to receive the second power signal, and a cathode of the first diode is coupled to a cathode of the second diode.

11. The signal transmission line system of claim 6, wherein the signal transmission line has a redriver, and the control module provides the output power signal to the redriver via the socket end.

12. The signal transmission line system of claim 11, wherein the redriver is arranged inside the second plug.

13. The signal transmission line system of claim 6, wherein the first plug receives a data signal from the first device, and the data signal is transmitted to a second device electrically connected to the second plug via the line set.

* * * * *